United States Patent [19]
Stein

[11] Patent Number: 6,038,526
[45] Date of Patent: *Mar. 14, 2000

[54] METHOD FOR DETECTING WEAK SIGNALS IN A NON-GAUSSIAN AND NON-STATIONARY BACKGROUND

[75] Inventor: David W. J. Stein, San Diego, Calif.

[73] Assignee: The United States of America as represented by the Secretary of the Navy, Washington, D.C.

[ * ] Notice: This patent is subject to a terminal disclaimer.

[21] Appl. No.: 09/111,369

[22] Filed: Jun. 24, 1998

[51] Int. Cl.$^7$ ....................................................... H03M 1/08
[52] U.S. Cl. ........................... 702/191; 702/179; 342/159
[58] Field of Search ..................................... 702/191, 189, 702/190, 194, 193, 179; 704/256; 348/607; 342/159

[56] References Cited

U.S. PATENT DOCUMENTS

| | | | |
|---|---|---|---|
| 4,587,620 | 5/1986 | Niimi et al. | 364/574 |
| 5,694,342 | 12/1997 | Stein | 364/572 |

OTHER PUBLICATIONS

Hummels, D.M. and Jiao Ying, "Locally Optimal Detection of Unknown Signals in Non–Gaussuan Markov Noise," Proceedings of the 34th Midwest Symposium on Circuits and Systems, vol. 2, pp. 1098–1011, (Orono, Maine), May 14, 1991.

Stein, David W. J., "Detection of Random Signals in Gaussian Mixture Noise," IEEE Transactions on Information Theory, vol. 41, No. 6, pp. 1788–1801, Nov. 1995.

Detection of Random and Sinusoidal Signals in Hidden Markov Noise, Conference Record of the Thirtieth Asilomar Conference on Signals, Systems and Computers, vol. 1, pp. 464–468, (San Diego, CA) Nov. 3, 1996.

Stein, David W. J., "Applying Hidden Markov Models to Radar Detection in Clutter," Radar 97 Conference Publication, No. 449, pp. 586–590, (San Diego, CA) Oct. 1997.

*Primary Examiner*—Patrick Assouad
*Attorney, Agent, or Firm*—Harvey Fendelman; Peter A. Lipovsky; Michael A. Kagan

[57] ABSTRACT

A method is described for detecting weak signals in a non-Gaussian and non-stationary background using a hidden Markov parameter estimator. The method comprises the steps of: a) partitioning input data into sets of range bins, where the input data has a noise component; b) estimating hidden Markov model parameters from the input data; c) determining the average intensity $I_i$ of the range bins, where i represents an index for the ranges bins, and $1 \leq i \leq R$, and R represents the total number of range bins; d) estimating the average noise intensity $N_i$ of each range bin; e) determining the residual intensity estimates $\rho_i$ of each range bin as the maximum of 0 and $(I_i - N_i)$ for all values of i; f) transforming the hidden Markov model parameters into estimates of hidden Markov model parameters of the noise component of the input data; g) generating modified locally optimal detection statistics representing the likelihood that the input data for the range bins contains a signal of interest using the estimates of the hidden Markov model parameters of the noise component of the input data, the residual intensity estimates, and the input data; h) transforming the modified locally optimal detection statistic into normalized values of the detection statistics applied to each range bin; and i) generating a detection output signal if any of the normalized values of the detection statistics exceeds a threshold.

9 Claims, 2 Drawing Sheets

METHOD FOR DETECTING WEAK SIGNALS IN A NON-GAUSSIAN AND NON-STATIONARY BACKGROUND

BACKGROUND OF THE INVENTION

The present invention relates to the field of signal processing, and more particularly, to a method for detecting weak signals in a non-stationary, non-Gaussian background using a hidden Markov parameter estimator.

Radar systems are often used to detect signals from non-stationary and non-Gaussian environments. One type of system for detecting signals from such environments is described with reference to U.S. Pat. No. 5,694,342, entitled A Method for Detecting Signals In Non-Gaussian Background Clutter. In the system described in the '342 patent, input data represents a collection of successive intensities (norm squared) of baseband demodulated range-walk-corrected radar returns from a set of range bins organized into a range-by-pulse matrix $X=(x_{ij})$, where R is the number of range bins, P is the number of pulses, and $1 \leq i \leq R$, $1 \leq j \leq P$. The data are filtered to partition range bins having exponentially distributed data from those that have non-exponentially distributed data. The intensities of the exponentially distributed data are estimated. Exponential mixture distributions are fit to each range bin of the non-exponential data. Then, noise parameters are selected for each range bin. The residual intensity of the data in each range bin is estimated. A detection statistic $M_i$ and the standard deviation $N_i$ are determined for each range bin. A normalized detection statistic $S_i$ is defined by $S_i=M_i/N_i$. The maximum value, $S_{max}$, and the mean, $S_{mean}$, and standard deviation, $S_{std}$, of all $S_i$ excluding $S_{max}$ are determined. A threshold $\tau_\alpha$ corresponding to a false alarm probability $\alpha$ is determined. An output signal is generated for range bin i if $(S_i - S_{max})/S_{std} \geq \tau_\alpha$.

The system described in the '342 patent generally requires 50 or more data samples, and more preferably, 100+ data samples, to perform reasonable estimates of the model parameters. It would be desirable to develop a system that could detect weak signals in a non-Gaussian, non-stationary background which required fewer data samples.

SUMMARY OF THE INVENTION

A method is described for detecting weak signals in a non-Gaussian and non-stationary background using a hidden Markov parameter estimator. The method comprises the steps of: a) partitioning input data into sets of range bins, where the input data has a noise component; b) estimating hidden Markov model parameters from the input data; c) determining the average intensity $I_i$ of the range bins, where i represents an index for the ranges bins, and $1 \leq i \leq R$, and R represents the total number of range bins; d) estimating the average noise intensity $N_i$ of each range bin; e) determining the residual intensity estimates $\rho_i$ of each range bin as the maximum of 0 and $(I_i - N_i)$ for all values of i; f) transforming the hidden Markov model parameters into estimates of hidden Markov model parameters of the noise component of the input data; g) generating modified locally optimal detection statistics representing the likelihood that the input data for the range bins contains a signal of interest using the estimates of the hidden Markov model parameters of the noise component of the input data, the residual intensity estimates, and the input data; h) transforming the modified locally optimal detection statistic into normalized values of the detection statistics applied to each range bin; and i) generating a detection output signal if any of the normalized values of the detection statistics exceeds a threshold.

The invention preferably may be implemented as a set of computer readable program instructions which may be encoded onto a program storage device such as magnetic tape, a floppy disk, magnetoptical disk, compact disk, computer memory, or the like. The storage device embodies the program of instructions for implementing the function of detecting weak signals in a non-Gaussian and non-stationary backgrounds.

The hidden Markov parameter estimator offers improved performance and simpler implementations compared to the prior art exponential mixture detector. The hidden Markov parameter estimator generalizes the exponential mixture model and may more accurately represent backgrounds such as radar sea clutter. The correlation structure of the hidden Markov parameter estimator provides a simpler way to treat the non-stationary components of the data as time series having a variety of probability distributions. The invention estimates the Markov model parameters on blocks of range bins which leads to more accurate estimates of the noise parameters for the input data.

These and other advantages of the invention will become more apparent upon review of the accompanying drawings and specification, including the claims.

DESCRIPTION OF THE PREFERRED EMBODIMENT

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
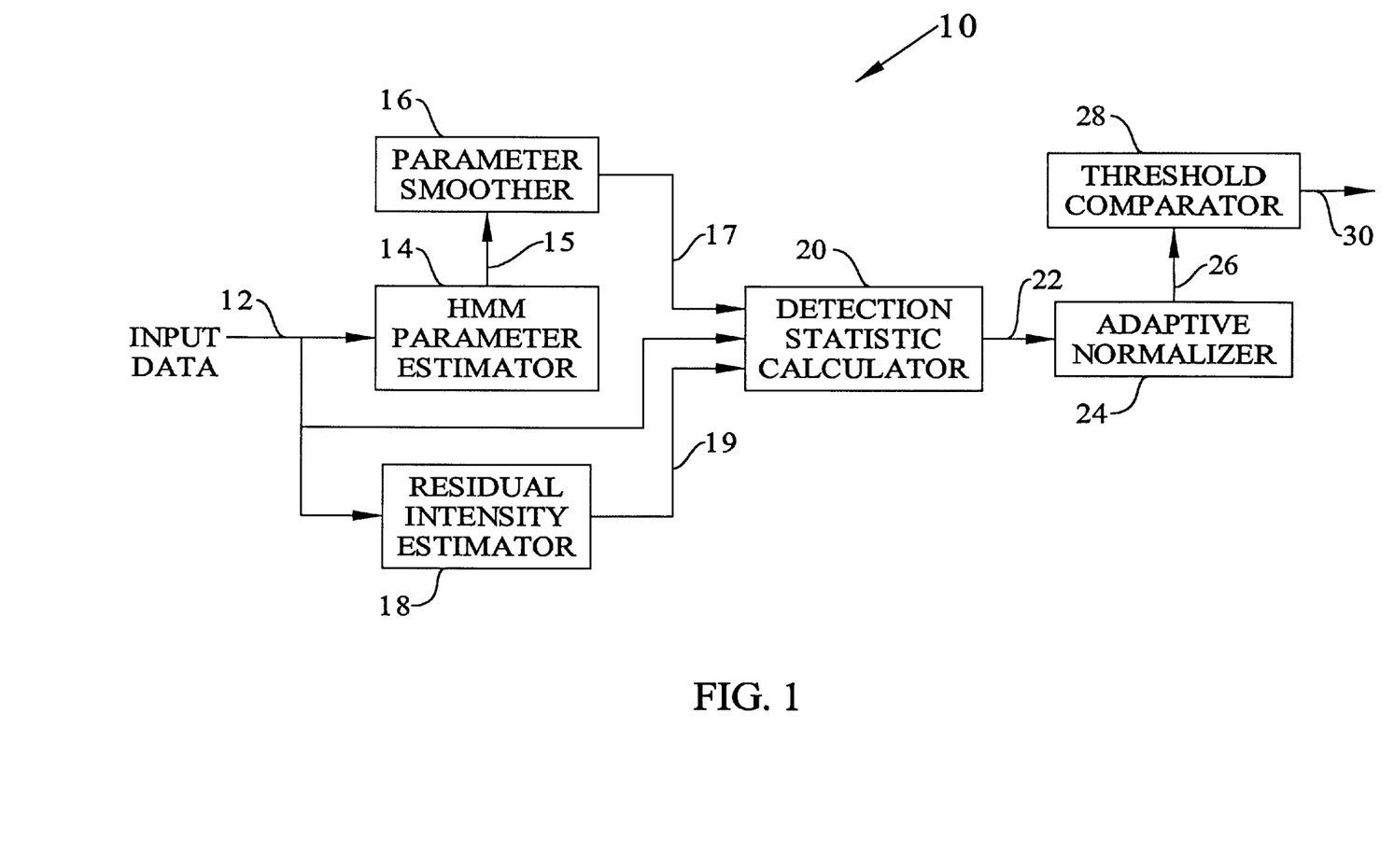
FIG. 1 is a block diagram of a system for detecting signals in non-Gaussian and non-stationary background which embodies various features of the present invention.

Referring to FIG. 1, the present invention employs a hidden Markov parameter estimator for providing a method 10 for detecting weak signals in a non-Gaussian and non-stationary background such as radar sea clutter, acoustic data containing moving interferers, and seismic data. The invention preferably may be implemented as computer readable program instructions which may be encoded onto a program storage device such as magnetic tape, a floppy disk, magnetooptical disk, compact disk, computer memory, or the like. The storage device embodies the program of computer executable instructions for implementing the functions of the detector.

Method 10 comprises a hidden Markov model parameter estimator 14, parameter smoother 16, residual intensity estimator 18, detection statistic calculator 20, adaptive normalizer 24, and a threshold comparator 28. ATTACHMENT 1 provides, by way of example, a listing of a computer program for implementing the invention, and more particularly, each of the elements depicted in FIG. 1. A cross-reference between each of the functional blocks in FIG. 1 and specific program listings is provided in TABLE 1, below. The computer program represented in ATTACHMENT 1 was written in MATLAB®. However, it is to be understood that software for implementing the invention may be written in any suitable computer language.

TABLE 1

CROSS REFERENCE BETWEEN FUNCTIONAL BLOCKS OF FIG. 1
AND PROGRAM LISTINGS IN ATTACHMENT 1

| Function Depicted In FIG. 1 | Lines In Attachment 1 |
|---|---|
| HMM Parameter Estimator 14 | 211–306 |
| Parameter Smoother 16 | 128–167 |
| Residual Intensity Estimator 18 | 489–492 and 536–600 |
| Detection Statistic Calculator 20 | 603–638 |
| Adaptive Normalizer 24 | 172–185 |
| Threshold Comparator 28 | 186, 187 |

Input data 12 may represent a collection of successive intensities (norm squared) of baseband demodulated optical, radar, or sonar signal returns comprising a set of range bins organized into a range-by-pulse matrix $X=(x_{ij})$, where R is the number of range bins, P is the number of pulses and $1 \leq i \leq R$, $1 \leq j \leq P$. Input data may represent, by way of example, radar, sonar, or optical return signals. The return signals may also include electromagnetic radiation other than radar or optical signal returns. For example, if input data 12 represents radar range bin data consisting of 512 range bins and 32 pulses, input data 12 may be structured in a 512×32 matrix. Input data 20 are input to Hidden Markov Model (HMM) parameter estimator 14, detection statistic calculator 20, and residual intensity estimator 18. HMM parameter estimator 14 partitions the range bins into sub-blocks representing some number of range bins and generates HMM parameters 15 for each sub-block of range bins. Parameter smoother 16 is an averaging filter that transforms HMM parameters 15 into an output signal 17 representing estimates of the HMM parameters of the noise component of input data 20.

Residual intensity estimator 18 transforms input signal 12 into output signal 19 which represents estimates of the noise power for each range bin of input data 12. In response to receiving input signals 12, 17, and 19, detection statistic calculator generates a modified locally optimal detection statistic 22 representing the likelihood that the input data for a given range bin contains a signal of interest. Adaptive normalizer 24 transforms signal 22 into an output signal 26 representing normalized values of the detection statistic applied to each range bin. Adaptive normalizer 24 transforms the detection statistic values represented in output signal 22 for each range bin to units of standard deviation from the mean value of the detection statistic for that block of range bins. The range bins selected to compute the normalized output values in signal 26 are range bins in a sub-block except the range bin in question and a specified number of guard bands on either side of the range bin in question. Threshold comparator 28 compares the value of the normalized detection statistic from signal 26 with a predetermined threshold, and generates a detection output signal 30 for the range bin if the normalized value of signal 26 exceeds the threshold.

Figure 2:
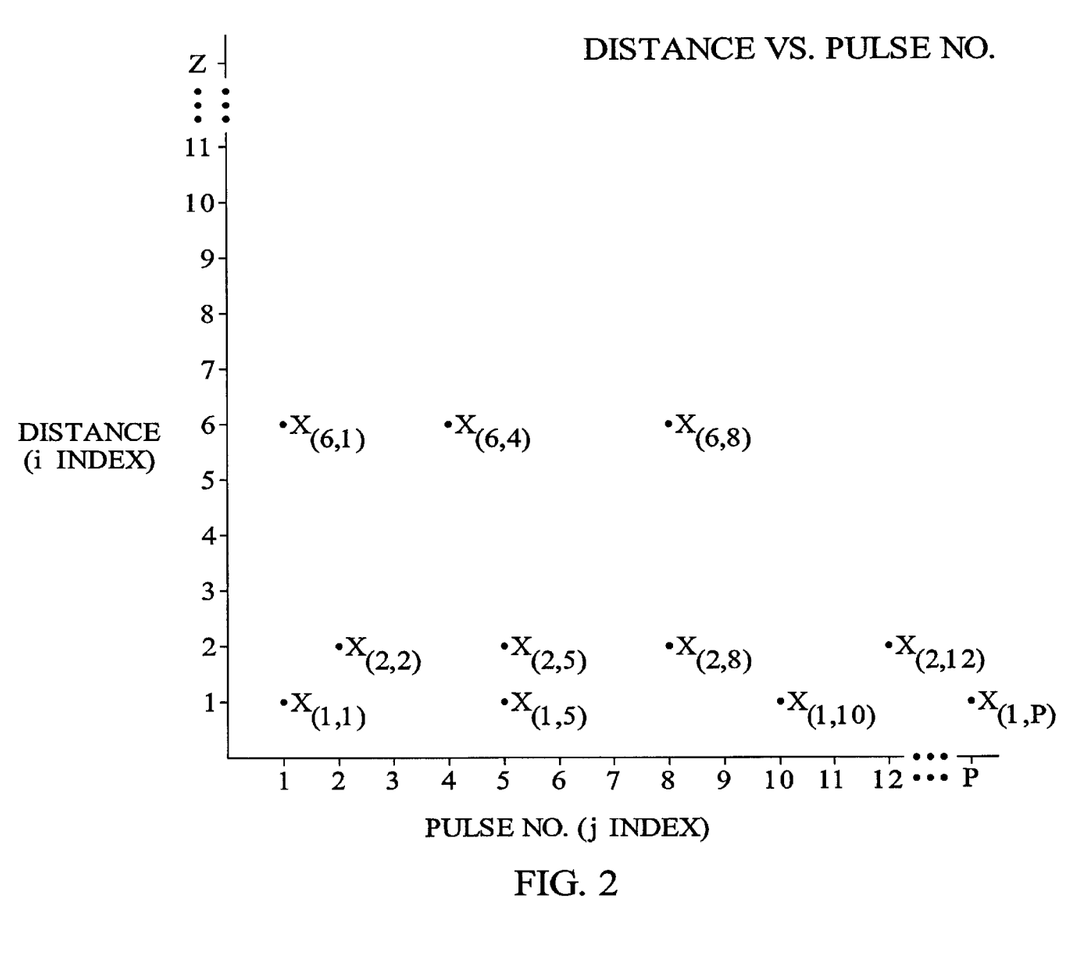
FIG. 2 is a graph which shows range data, $X_{ij}$, associated with a particular pulse having an index j, and a particular distance associated with an index value, i, where i and j are positive integers.

HMM parameter estimator 14 partitions input data 12 into blocks of range bins. Range bins are described with reference to FIG. 2. FIG. 2 is a graph which shows that various values of range data, $X_{ij}$, are associated with a particular pulse having an index j, indicated on the horizontal axis, and a particular distance associated with an index value, i, shown on the vertical axis, where i and j are positive integers, P represents the total number of pulses, and Z represents the furthest distance for which range data is stored. In the case in which pulse number 1 has an index j where j=1, range data corresponding to signal returns are represented by range data $X_{(i,j)}$, where i=1 to Z. Range data, $X_{(6,1)}$ may represent a signal return from a distance associated with an index value equal to 1, where j=1. By way of example, pulse number 1 may be an acoustic, radar, or optical pulse. Range bins are defined as the set of range data $X_{(C,j)}$, where C is a positive integer constant. Contiguous range bins are defined as the set of range data $X_{(\alpha,j)}$ and the set of range data $X_{(\alpha \pm 1, j)}$ where $\alpha$ is an integer constant, and $2 \leq \alpha \leq (z-1)$. Hidden Markov model parameters are estimated for each block of range data $X_{(i,j)}$, where $1 \leq j \leq P$, by using the expectation and maximization algorithm (EM). The number of states of the Markov model is denoted by m. For m=1, the data are modeled as having an exponential distribution, and the expected value of the data is estimated. A goodness of fit test, such as chi-squared, is used to compare the empirical distribution of the data and the model distribution. If the test indicates that the data do not have an exponential distribution, then hidden Markov model parameters are estimated for m=2. If the goodness of fit test fails for m=2, then the parameters are estimated for m=3, and so on. For $m \geq 2$ the HMM is defined by the state transition parameters, the initial distribution of the states, and the distribution of the observations for given states. For $1 \leq i, j \leq m$, the probability of transiting from state i to state j is denoted by $\alpha_{ij}$. The data generated by state j are assumed to have an exponential distribution with parameter $v_j$, i.e.

$$p(x|j) = \exp(-x/(2v_j)).$$

The initial probability of observing a datum from state j is $\pi_j$.

The estimation of the values of the parameters $\{\alpha_{ij}, v_j, \pi_j\}_{1 \leq i,j \leq m}$ proceeds by 1) using the EM algorithm to estimate initial values of $v_j$ and $\pi_j$ for the stationary distribution of the HMM, which is an exponential distribution, selecting initial values for the $\alpha_{ij}$, and applying the EM algorithm to obtain maximum likelihood estimates of the HMM parameters, or 2) by using values of the HMM parameters obtained from spatially-temporally continuous range as initial values of the EM algorithm and applying the EM algorithm.

The HMM parameters 15 are estimated from input data 12 that may contain signal as well clutter and noise, however detection statistic calculator 20 performs best using HMM parameters of the noise component of input data 12. Parameter smoother 16 reduces the effect of the possible presence of signal components on the HMM parameter estimates 15. HMM parameter estimates 15 may be represented by $\{v_j, \alpha_{ij}, \pi_j\}$, for $1 \leq ij \leq m$, where m is the number of states, $v_j$ is the expected intensity of state j, $v_i < v_j$ if i<j, $\alpha_{ij}$ is the probability of transitioning from state i to state j, and $\pi_j$ is the initial probability of state j. Parameter smoother 16 first removes the influence of a possible signal component from $v_1$ by replacing the original estimate of $v_1$ obtained for each block of range bins, with an order statistic applied to the set of original estimates of $v_1$. If for each block of range bins the replacement value of $v_1$ is below the original value, and m=1, then a second state is added by setting $v_2$ equal to the original value of $v_1$ and defining state transition probabilities $\alpha_{ij}$ for $1 \leq i,j \leq 2$ and initial probabilities $\pi_j$ for $1 \leq j \leq 2$. Next, parameter smoother 16 imposes a lower limit on the ratio $v_2/v_1$. If $v_2/v_1$ is below this limit, then $v_2$ is replaced with a values such that the lower bound of the ratio $v_2/v_1$ is achieved. By way of example, the lower limit may be selected whereby the lower limit of $v_2/v_i$ is equal to 1.5, a value developed empirically. However, it is to be understood that other values for the lower limit of $v_2/v_i$ may also be used to suit the requirements of a particular application. The third major step performed by parameter smoother 16 is to place an upper bound on $\alpha_{11}$ by replacing any values of $\alpha_{11}$ that exceed the value of the upper bound with the value of the upper bound and adjust other transition probabilities to maintain the relationship:

$$\sum_{j=1}^{m} a_{1j} = 1.$$

Residual intensity estimator 18: 1) determines the average intensity of each range bin; 2) estimates the noise power for each range bin; and 3) substracts the noise power estimate from the value associated with the average intensity of each range bin if the noise power estimate is below the average intensity of the range bin. This difference is provided as output signal 19 and is denoted $\rho_i$. The noise power estimates may be obtained by using order statistics to obtain initial estimates and a linear prediction filter to estimate local maxima of the noise power intensity that are not well represented by the order statistics. If two estimates of the noise power are determined for a range bin, then residual intensity estimator 18 selects the larger value representing the noise power. $b_i(o_j)$ Detection statistic calculator 20 calculates a detection statistic for each range bin. The detection statistic is; defined in terms of input data 12, HMM parameters 15, and the scaled forward and backward coefficients, $\alpha_j(i)$ and $\beta_j(i)$, respectively of HMM parameters 15, as defined in equations 2 through 14, modified to include the residual intensity determined by adding $\rho_i$ and $v_i$ in the definition of $b_i(o_j)$ defined further herein. The output values 22 of detection statistic calculator 20 are:

$$LO(O) = \sum_{k=1}^{n} \sum_{j=1}^{m} \left( \frac{-2}{v_j} + \frac{|o_k|^2}{V_j^2} \right) \frac{\alpha_k'(j)\beta_k'(j)}{\sum_{i=1}^{n} \alpha_k'(i)\beta_k'(i)}.$$

The scaled forward and backward coefficients of HMM parameter estimates 15, $\alpha_j(i)$ and $\beta_j(i)$, respectively are defined as follows. Assume that HMM parameters $\{\alpha_{ij}, v_j, \pi_j\}$ have been obtained for observations $\overline{O} = (o_1, \ldots, o_n)$, and that $b_i(o_j)$ is the probability of $o_j$ given state i, i.e:

$$b_i(o_j) = \frac{1}{2\pi(v_i + \rho_i)} \exp\left(-\frac{|o_j|^2}{2(v_i + \rho_i)}\right).$$

Then the scaled forward coefficients are defined recursively by $$\alpha_1'(i) = \frac{b_i(o_1)}{\sum_{j=1}^{m} b_j(o_1)};$$

$$\hat{\alpha}_j(i) = \left(\sum_{k=1}^{m} \alpha_{j-1}'(k) a_{ki}\right) b_i(o_j);$$

$$c_j = \left(\sum_{i=1}^{m} \hat{\alpha}_j(i)\right)^{-1};$$

and $$\alpha_j'(i) = c_j \hat{\alpha}_j(i).$$

The scaled backwards coefficients are also defined recursively by:

$$\beta_n(i) = 1;$$

$$\beta_n'(i) = c_n \beta_n(i);$$

and $$\beta_j'(i) = c_j \sum_{k=1}^{m} \beta_{j+1}'(k) \alpha_{ik} b_k(o_{j+1}).$$

Adaptive normalizer 24 transforms signal 22 into an output signal 26 representing normalized values of the detection statistic applied to each range bin. For each range bin, the mean $S_{mean}$ and standard deviation $S_{std}$ of the output values 22 provided by detection statistic calculator 20 from the bins of the block excluding the given bin and guard bins are calculated. Output signal 22 of detection statistic calculator 20 on the test bin is normalized as $T = (LO(O) - S_{mean})/S_{std}$, where T represents the output value 26 from adaptive normalizer 24.

Threshold comparator 28 compares the normalized output values 26 from adaptive normalizer 24 to a threshold $\tau$. Threshold comparator 28 generates an output signal 30 is generated if $T > \tau$.

Obviously, many modifications and variations of the present invention are possible in light of the above teachings. It is therefore to be understood that within thescope of the appended claims, the invention may be practiced otherwise than as specifically described.

APPENDIX 1

```
1   function
2   drmaramc(dirnam,ifbase,ofbase,ffile,lfile,numrb,numpl,nppswa,nrbpb,rifl
3   ag,numspe,pfa)
4   maxfn = 283;
5   numsw = numpl/nppswa;
6   rbrat = numrb/nrbpb;
7   cnpse = zeros(numrb,numspe);
8   nnpse = zeros(numrb,numspe);
9   cnpv = zeros(numrb,1);
10  nnpv = zeros(numrb,1);
11  dn2X = zeros(numrb,2*numpl);
12  inpm = zeros(numrb,numspe);
13  cnpse = zeros(numrb,numspe);
14  if (1<=ffile) & (ffile <=9)
15     zterm = '000';
16  elseif (10 <= ffile) & (ffile <= 99)
17     zterm = '00';
18  elseif (100<=ffile) & (ffile <=999)
19     zterm = '0';
20  end;
21  cifile = [dirnam,ifbase,zterm,num2str(ffile)];
22  eval(['load ',cifile]);
23  cn2X = abs(X).^2;
24  dn2X = [cn2X cn2X];
25  for jj = 1:numspe
26     inpm(:,jj) = mean(cn2X(:,1+(jj-1)*nppswa:jj*nppswa)')';
27  end;
28  cnpm = inpm;
29  inpv = mean(inpm')';
30  cnpv = inpv;
31  for ii = ffile:lfile
32     cn2X = dn2X(:,numpl+1:2*numpl);
33     dn2X(:,1:numpl) = cn2X;
34     if (1<=ii) & (ii <=9)
35        zterm = '000';
36     elseif (10 <= ii) & (ii <= 99)
37        zterm = '00';
38     elseif (100<=ii) & (ii <=999)
39        zterm = '0';
40     end;
41     if (1<=ii+1) & (ii+1 <=9)
42        pzterm = '000';
43     elseif (10 <= ii+1) & (ii+1 <= 99)
44        pzterm = '00';
45     elseif (100<=ii+1) & (ii+1 <=999)
46        pzterm = '0';
47     end;
48     slodo = zeros(numrb,numsw);
49     snlodo = zeros(numrb,numsw);
50     ssp0 = zeros(3,numsw*rbrat);
51     sstm = zeros(9,numsw*rbrat);
52     ssvv = zeros(3,numsw*rbrat);
53     ssns = zeros(numsw*rbrat,1);
54     smbdata = zeros(numsw*rbrat,1);
```

79280apx                1
Navy Case No. 79280

```
55        snitv = zeros(numsw*rbrat,1);
56        sucmdata = zeros(11,numsw*rbrat);
57        cifile = [dirnam,ifbase,pzterm,num2str(ii+1)];
58        cofile = [dirnam,ofbase,zterm,num2str(ii)];
59          if ii < maxfn
60            fprintf('loading %s\n',cifile);
61            eval(['load ',cifile]);
62            nn2X = abs(X).^2;
63            dn2X(:,numpl+1:2*numpl)   = nn2X;
64          end;
65          for kk = 1:numsw
66            dm = cn2X(:,nppswa*(kk-1)+1:nppswa*kk);
67            cbnp = mean(dm')';
68            nups = kk+(numspe-1)/2;
69            if ((ii > ffile) & (ii< maxfn)) | ((ii== ffile) & (nups >
70  numspe)) | ((ii== maxfn)& (nups <= numsw))
71              upnpv = mean(dn2X(:,(nups-1)*nppswa+1:nups*nppswa)')';
72              upnpm = [cnpm(:,2:numspe) upnpv];
73              nnpv = cnpv+((upnpv-cnpm(:,1))/numspe);
74              cnpv = nnpv;
75              cnpm = upnpm;
76            end;
77            mcnpv = max([cnpv';cbnp'])';
78  [lodo,nlodo,sp0,stm,svv,sns,mbdata,nitv,ucmdata,ETHI,ETHV] =
79  mamps2bl(dm,nppswa,numrb,nppswa,nrbpb,mcnpv,riflag,pfa);
80            snlodo(:,kk) = nlodo;
81            slodo(:,kk) = lodo;
82            ssp0(:,(kk-1)*rbrat+1:kk*rbrat) = sp0;
83            sstm(:,(kk-1)*rbrat+1:kk*rbrat) = stm;
84            ssvv(:,(kk-1)*rbrat+1:kk*rbrat) = svv;
85            ssns((kk-1)*rbrat+1:kk*rbrat) = sns;
86            smbdata((kk-1)*rbrat+1:kk*rbrat) = mbdata;
87            snitv((kk-1)*rbrat+1:kk*rbrat) = nitv;
88            sucmdata(:,(kk-1)*rbrat+1:kk*rbrat) = ucmdata;
89          end;
90          outvar = ' slodo snlodo ssp0 sstm ssvv ssns smbdata snitv sucmdata
91  ETHI ETHV ';
92          eval(['save ',cofile,outvar]);
93  end;
94
95
96  function [lodo,nlodo,sp0,stm,svv,sns,mbdata,nitv,ucmdata,ETHI,ETHV] =
97  mamps2bl(n2X,npdm,nrbdm,nppb,nrbpb,npv,riflag,pfa);
98
99  maxns = 3;
100 t0 = clock;
101 gblsv = 0;
102 nblsv = 6;
103 lsper = 50;
104 dtflag = 0
105 ns = 2;
106 nflag = 0;
107 plrat = npdm/nppb;
108 rbrat = nrbdm/nrbpb;
109 numts = nrbdm*plrat;
110 dmra1 = zeros(numts,nppb);
111 % dmra2 = zeros(nppb*nrbpb,rbrat*plrat);
```

```
112     figure(1)
113     set(gcf,'units','normal');
114     set(gcf,'position',[0 .6 .3 .4])
115
116     image(n2X*256/max(max(n2X)));
117     drawnow
118     for ii = 1:plrat
119         n2dmra1([(ii-1)*nrbdm+1:ii*nrbdm],:) = n2X(:,(ii-
120 1)*nppb+1:ii*nppb);
121     end;
122     n2dmra1t = n2dmra1';
123     parmat = reshape(n2dmra1t,nppb*nrbpb,rbrat*plrat);
124 %
125     [sp0,stm,svv,sns,mbdata,nitv,ucmdata,lilike] =
126 hmms2a(parmat,dtflag,nflag,maxns);
127
128 % smooth the estimate of the low state variance
129     lsv = svv(1,:);
130     for jj = 1:length(lsv)
131         clsvset = setselec(lsv,gblsv,nblsv,jj);
132         sclsvset = sort(clsvset);
133         slsv(jj) = sclsvset(ceil((lsper/100)*nblsv));
134         if sns(jj) == 1 & slsv(jj) < svv(1,jj)
135             sns(jj) = 2;
136             svv(2,jj) = svv(1,jj);
137             stm(1,jj) = .9;
138             stm(2,jj) =  .3;
139             stm(3,jj) = .1;
140             stm(4,jj) = .7;
141             sp0(1,jj) = .75;
142             sp0(2,jj) = .25;
143         end;
144     end;
145     svv(1,:) = slsv;
146
147
148
149 % put a floor on the v2/v1 ratio
150     I2 = find(sns > 1);
151     floor2 = 1.5*svv(1,I2);
152     newv2 = max([floor2;svv(2,I2)]);
153     svv(2,I2) = newv2;
154
155 %  cap the 1-1transition probability
156     I1 = find(sns == 2);
157     stm(1,I1) = min([stm(1,I1);.90*ones(1,length(I1))]);
158     stm(3,I1) = 1-stm(1,I1);
159     I5 = find(sns == 3);
160     if length(I5) > 0
161         tempt1 = min([stm(1,I5);.90*ones(1,length(I5))]);
162         t1dif = stm(1,I5)-tempt1;
163         stm(1,I5) = tempt1;
164         t1num = stm(4,I5)+stm(7,I5);
165         stm(4,I5) = stm(4,I5)+(t1dif.*(stm(4,I5)./t1num));
166         stm(7,I5) = stm(7,I5)+(t1dif.*(stm(7,I5)./t1num));
167     end;
168
```

```
169
170       sdo1 = hmlods2b(svv,stm,n2dmra1,nrbpb,sns,sp0,npv);
171        lodo = sum(sdo1')';
172       nlodo = zeros(nrbdm,1);
173    %  put in a block normalization
174       nskip = 1;
175       for nn = 1:rbrat
176          meanvec = zeros(nrbpb,1);
177          stdvec = zeros(nrbpb,1);
178          llodo = lodo(1+(nn-1)*nrbpb:nn*nrbpb);
179           for pp = 1:nrbpb
180              meanvec(pp) = mean(llodo([1:pp-nskip-1,pp+nskip+1:nrbpb]));
181              stdvec(pp) = std(llodo([1:pp-nskip-1,pp+nskip+1:nrbpb]));
182           end;
183   nllodo = (llodo-meanvec)./stdvec;
184       nlodo(1+(nn-1)*nrbpb:nn*nrbpb,1) = nllodo;
185       end;
186       thresh = sqrt(2)*erfinv(1-2*pfa);
187       [ETHI ETHV] = find(nlodo > thresh);
188       figure(2)
189       set(gcf,'units','normal');
190       set(gcf,'position',[.32 .6 .3 .4])
191    %   clf
192       plot(nlodo)
193       figure(3)
194       set(gcf,'units','normal');
195       set(gcf,'position',[.63 .6 .3 .4])
196       subplot(3,1,1),plot(stm(1,:))
197       subplot(3,1,2),plot(stm(4,:))
198       subplot(3,1,3),plot(svv(2,:)./svv(1,:))
199       drawnow
200       [mv,mi] = max(nlodo);
201       fprintf('max det out %d index of max %d\n',mv,mi)
202       maxclv = max(nlodo([1:mi-2,mi+2:nrbdm]));
203       fprintf('maxclv = %d\n',maxclv)
204    %  t1 = clock;
205       et = etime(clock,t0)
206
207    keyboard
208    %close(4)
209
210
211    function [sp0,stm,svv,sns,mbdata,nitv,ucmdata,lilike] =
212    hmms2a(dm,dtflag,nflag,maxns);
213    %
214    itm2 = [.9 .1;.3 .7];  % initial 2-state transition matrix
215    itm3 = [.8 .1 .1; .1 .8 .1; .1 .1 .8]; % initial 3-state transition
216    matrix
217    if dtflag == 1
218       dm = abs(dm).^2;
219    end;
220    [mm,nn] = size(dm);
221    ucmdata = zeros(11,nn);
222    sp0 = zeros(3,nn);
223    svv = zeros(3,nn);
224    stm = zeros(9,nn);
225    sns = zeros(nn,1);
```

```
226    lilike = zeros(3,nn);
227    % convergence criteria for the EM algorithm
228    Tp0 = 5.0e-2;
229    Tvv = 5.0e-2;
230    Ttm = 5.0e-2;
231    % store the number of iterations
232    nitv = zeros(nn,1);
233    %maximum number of iterations
234    mit = 500;
235    for ii = 1:nn
236        fprintf('hmarmod2 ii = %d\n',ii);
237        cdv = dm(:,ii);
238        if ii == 1
239            [cpv,cvv,cns,cfitv,cmv,cbn]=ucemstat(cdv,1,maxns);
240        else
241            iunv1 = cbn;
242            ipv = .9;
243    [cpv,cvv,cns,cfitv,cmv,cbn]=ucemstai(cdv,1,ipv,iunv1,maxns);
244        end;
245        sns(ii) = cns;
246        cndv = cdv/cmv;
247        if cns == 2
248            if cvv(2) < cvv(1)
249                tempvv = cvv(1);
250                cvv(1) = cvv(2);
251                cvv(2) = tempvv;
252                temppv = cpv(1);
253                cpv(1) = cpv(2);
254                cpv(2) = temppv;
255            end;
256    end;
257        ucmdata(1:5+cns*2,ii) = [cmv;cns;cfitv;cpv;cvv];
258        lilike(1,ii) = mm*log(.5)-.5*sum(cndv);
259        if cns == 1
260            sp0(1,ii) = 1;
261            if nflag == 0
262                svv(1,ii) = 1*cmv;
263            else
264                svv(1,ii) = 1;
265            end;
266            stm(1,ii) = 1;
267        else
268            if cns == 2
269                itm = itm2;
270                lilike(2,ii) = ilikeexp(cndv,cpv,cvv);
271            else
272                itm = itm3;
273                lilike(2,ii) = ilik3exp(cndv,[cpv;cvv]);
274            end;
275            ctm = itm;
276            dp0 = 1;
277            dvv = 1;
278            dtm = 1;
279            kk = 0;
280            sp0(1:cns,ii) = cpv;
281            while (dp0 > Tp0 | dvv > Tvv | dtm > Ttm) & kk < mit
282                [upv,utm,uvv] = update(cns,mm,cpv,ctm,cvv,cndv);
```

```
283            dp0 = max(abs(upv-cpv));
284            dvv = max(abs((uvv-cvv)./cvv));
285            dtm = max(max(abs(utm-ctm)));
286            ctm = utm;
287            cvv = uvv;
288            cpv = upv;
289            kk = kk+1;
290        end;
291         if nflag == 0
292            svv(1:cns,ii) = cvv*cmv;
293        else
294            svv(1:cns,ii) = cvv;
295        end;
296        stm(1:(cns^2),ii) = ctm(:);
297        fprintf('iterations required %d \n',kk);
298        nitv(ii) = kk;
299         clik = lilike(:,ii);
300        clik
301     end;
302    if rem(ii,100) == 0
303        save temp
304    end;
305 end;
306 save temp
307
308
309 function [pv,vv,ns,fitv,mbdata,cbv] = ucemstat(dm,pflag,maxns)
310 %
311 sl1co = 0.001;
312 sl2co = 0.001;
313 slks1 = .85;
314 vratco = 5.0;
315 [m,n] = size(dm);
316 if n > 1
317    dm = dm.';
318 end;
319 fitv = -1*ones(3,1);
320 mbdata = .5*mean(dm);
321 dmn = dm/mbdata;
322 figure(5)
323 clf
324 kslem1stat = kslchi22(dmn',1,pflag);
325 fitv(1) = kslem1stat(2);
326
327  if fitv(1) > slks1
328     ns = 1;
329     pv = 1;
330     vv = 1;
331     cbv = mbdata;
332  else
333     fprintf('estimating two state parameters\n')
334     if pflag == 1
335        hold on
336     end;
337     empar2 = estmexp(dmn);
338     cbv2 = mbdata*empar2(2);
339 kslem2stat = kslemix(dmn,empar2,pflag);
```

```
340         fitv(2) = ks1em2stat(2);
341         cvrat = empar2(3)/empar2(2);
342   if  maxns == 2 | cvrat <= vratco
343         ns = 2;
344         pv = [empar2(1);1-empar2(1)];
345         vv = empar2(2:3);
346         cbv = cbv2;
347   else
348         fprintf('estimating 3 state parameters')
349         empar3 = estexp3(dmn,empar2);
350         cbv3 = mbdata*empar3(4);
351   ks1em3stat = ks1emix3(dmn,empar3,pflag);
352         fitv(3) = ks1em3stat(2);
353
354         if fitv(2) > fitv(3)
355
356             ns = 2;
357             pv = [empar2(1);1-empar2(1)];
358             vv = empar2(2:3);
359             cbv = cbv2;
360         else
361             if empar3(5)*mbdata/cbv2 < 1.1
362                ns = 2;
363                pv = [empar2(1);1-empar2(1)];
364                vv = empar2(2:3);
365                cbv = cbv2;
366             else
367                ns = 3;
368                pv = empar3(1:3);
369                vv = empar3(4:6);
370                cbv = max([cbv2,cbv3]);
371             end;
372         end;
373      end;
374   end;
375   fitv
376
377   function [pv,vv,ns,fitv,mbdata,cbv] =
378   ucemstai(dm,pflag,ipv,univv,maxns)
379   sl1co = 0.001;
380   sl2co = 0.001;
381   slks1 = .85;
382   vratco = 5.0;
383   [m,n] = size(dm);
384   if n > 1
385      dm = dm.';
386   end;
387   fitv = -1*ones(3,1);
388   mbdata = .5*mean(dm);
389   dmn = dm/mbdata;
390   ivv = min([univv/mbdata .95]);
391   clf
392   ks1em1stat = ks1chi22(dmn',1,pflag);
393   fitv(1) = ks1em1stat(2);
394   %if chi2em1stat(2) > sl1co
395     if fitv(1) > slks1
396        ns = 1;
```

```
397        pv = 1;
398        vv = 1;
399        cbv = mbdata;
400     else
401        fprintf('estimating two state parameters\n')
402        if pflag == 1
403           hold on
404        end;
405         empar2 = estmexpi(dmn,ipv,ivv);
406
407         cbv2 = mbdata*empar2(2);
408   kslem2stat = kslemix(dmn,empar2,pflag);
409         fitv(2) = kslem2stat(2);
410
411         cvrat = empar2(3)/empar2(2);
412
413         if   maxns == 2 | cvrat <= vratco
414             ns = 2;
415             pv = [empar2(1);1-empar2(1)];
416             vv = empar2(2:3);
417             cbv = cbv2;
418   %      end;
419        else
420           fprintf('estimating 3 state parameters')
421           empar3 = estexp3(dmn,empar2);
422           cbv3 = mbdata*empar3(4);
423   kslem3stat = kslemix3(dmn,empar3,pflag);
424           fitv(3) = kslem3stat(2);
425   if fitv(2) > fitv(3)
426
427             ns = 2;
428             pv = [empar2(1);1-empar2(1)];
429             vv = empar2(2:3);
430             cbv = cbv2;
431            else
432            if   empar3(5)*mbdata/(max([univv,cbv2])) < 1.1
433              ns = 2;
434              pv = [empar2(1);1-empar2(1)];
435              vv = empar2(2:3);
436              cbv = cbv2;
437           else
438              ns = 3;
439              pv = empar3(1:3);
440              vv = empar3(4:6);
441              cbv = max([cbv2,cbv3]);
442            end;
443         end;
444      end;
445   end;
446   fitv
447
448
449   function [up0,utm,uvv] = update(ns,nt,cp0,ctm,cvv,dv);
450
451   %
452   % calculate scaled forward coefficients
453   dvflag = 1;
```

```
454    pdsflag = 1;
455    [sfcm,sf,pds] = sforcoef(ns,nt,ctm,cp0,cvv,dv,dvflag);
456    % calculate scaled backward coefficients
457    sbcm = sbackoef(ns,nt,ctm,cp0,cvv,dv,sf,pds,pdsflag,dvflag);
458    % update the transition matrix
459    tsbpm = sbcm(:,2:nt).*pds(:,2:nt);
460    tsfcm = sfcm(:,1:nt-1);
461    sgt = ctm.*(tsfcm*(tsbpm'));
462    sumsgti = (sum(sgt')).^(-1);
463    ntm = sgt.*(sumsgti'*ones(1,ns));
464    % update p0
465    probdat = sum(sfcm(:,nt));
466    np0 = (sfcm(:,1).*sbcm(:,1))/probdat/sf(1);
467    % update variance
468    uvmm = sfcm.*sbcm.*(ones(ns,1)*(sf.^(-1))');
469    suvm = sum(uvmm')';
470    nvv = .5*(uvmm*dv)./suvm;
471    up0 = np0;
472    uvv = nvv;
473    utm = ntm;
474
475
476
477      function [sdo1,rnp,resnp] = hmlods2b(svv,stm,dm,bls,sns,cp0m,npv);
478    %
479    dvflag = 1;
480    colim = 10000000;
481    cparind = 1;
482    sf = 1.25;
483    limf = 1.0;
484    uilim = 1.5;
485    liflag = 0;
486    gbnp2 = 1;
487    [aa,bb] = size(dm);
488    npow = (mean(dm')');
489    rnp = robnpow2(npv,npv,1,100,2,sf,uilim,gbnp2,liflag,limf);
490    hnpow = .5*npow;
491    pdif = (hnpow-sf*rnp)';
492    resnp = max([zeros(1,aa);pdif]);
493    % keyboard
494    sdo1 = zeros(aa,bb);
495    cns = sns(1);
496    cns2 = cns^2;
497    csvv = svv(1:cns,cparind);
498    cstmv = stm(1:cns2,cparind);
499    if cns > 1
500        ctm = reshape(cstmv,cns,cns);
501    cp0 = cp0m(1:cns,1);
502     else
503        ctm = 1;
504        cp0 = 1;
505    end;
506    for ii = 1:aa
507        cdv = dm(ii,:).';
508        nparind = floor((ii-1)/bls)+1;
509        if nparind > cparind
510            cparind = nparind;
```

```
511         cns = sns(cparind);
512         cns2 = cns^2;
513         csvv = svv(1:cns,cparind);
514         cstmv = stm(1:cns2,cparind);
515         if cns > 1
516             ctm = reshape(cstmv,cns,cns);
517             cp0 = cp0m(1:cns,cparind);
518         else
519             ctm = 1;
520             cstm = 1;
521             cp0 = 1;
522         end;
523     end;
524     csigvar = resnp(ii);
525
526     if cns > 1
527         [do1,do2] = marlodet(cns,bb,ctm,cp0,csvv,cdv,csigvar,dvflag);
528     else
529         do1 = (-2/csvv + cdv/(csvv^2));
530     end;
531     sdo1(ii,:) = do1';
532 end;
533
534
535 function rnp =
536 robnpow2(snpe,npow,gbnp,npper,nbnp,sf,ulim,gbnp2,liflag,limf);
537
538 [aa,bb] = size(snpe);
539 hsnpe = 0.5*snpe;
540 hnpow = 0.5*npow;
541 srnp = zeros(aa,1);
542 for ii = 1:aa
543     cnpset = setselec(hsnpe,gbnp,nbnp,ii);
544     scnpset = sort(cnpset);
545     srnp(ii) = scnpset(ceil((npper/100)*nbnp));
546 end;
547 prat = hnpow./srnp;
548 I1 = find(prat > ulim);
549 lI1 = length(I1);
550 for ii = 1:lI1
551     cind = I1(ii);
552     if cind < 4
553
554         a1 = hsnpe(cind+gbnp2+1);
555         a2 = hsnpe(cind+gbnp2+2);
556         if a2 < a1
557             linp = (a1+(a1-a2)*(gbnp2+1))*limf;
558         else
559             linp = a2;
560         end;
561         srnp(cind) = max([linp srnp(cind)]);
562     elseif cind > aa-3
563         b1 = hsnpe(cind-gbnp2-1);
564         b2 = hsnpe(cind-gbnp2-2);
565         if b2 < b1
566             linp = (b1+(b1-b2)*(gbnp2+1))*limf;
567         else
```

```
568            linp = b2;
569        end;
570        srnp(cind) = max([linp srnp(cind)]);
571     else
572        a1 = hsnpe(cind+gbnp2+1);
573        a2 = hsnpe(cind+gbnp2+2);
574        b1 = hsnpe(cind-gbnp2-1);
575        b2 = hsnpe(cind-gbnp2-2);
576        if b2 < b1
577            linpb = (b1+(b1-b2)*(gbnp2+1))*limf;
578        else
579            linpb = b2;
580        end;
581        if a2 < a1
582            linpa = (a1+(a1-a2)*(gbnp2+1))*limf;
583        else
584            linpa = a2;
585        end;
586        if liflag == 0
587            linp = max([linpa linpb]);
588        elseif liflag == 1
589            linp = mean([linpa linpb]);
590        end;
591        srnp(cind) = max([linp srnp(cind)]);
592     end;
593  end;
594  rnp = srnp;
595  prat2 = hnpow./rnp;
596  figure(4)
597  set(gcf,'units','normal');
598  set(gcf,'position',[.6 0 .3 .4])
599  plot(prat2);
600  drawnow
601
602
603  function [do1,do2] = marlodet(ns,nt,tm,p0,vv,dv,sigvar,dvflag);
604
605  %
606  if dvflag ~= 1
607      dv = abs(dv).^2;
608  end;
609  [aa,bb] = size(vv);
610  if bb == 1
611      vv = vv.';
612  end;
613  % modify vv by adding signal variance
614  datvv = vv+sigvar;
615  nvv = vv;
616  detmat = zeros(nt,ns);
617  [aa,bb] = size(dv);
618  if aa == 1
619      dv = dv.';
620  end;
621  dmat = dv*ones(1,ns);
622  nvmat2 = ones(nt,1)*(nvv.^(-2));
623  nvmat1 = ones(nt,1)*(-2*(nvv.^(-1)));
624  dnmat = nvmat1+nvmat2.*dmat;
```

```
625    % calculate scaled forward coefficients
626    dvflag = 1;
627    pdsflag = 1;
628    [sfcm,sf,pds] = sforcoef(ns,nt,tm,p0,datvv,dv,dvflag);
629    % calculate scaled backward coefficients
630    sbcm = sbackoef(ns,nt,tm,p0,datvv,dv,sf,pds,pdsflag,dvflag);
631    sbsfmat = (sfcm.*sbcm)';
632    sumsbsfmat = sum(sbsfmat')';
633    psgdat =   sbsfmat./(sumsbsfmat*ones(1,ns));
634    detmat = dnmat.*psgdat;
635    do1 = sum(detmat')';
636
637        do2 = do1;
638    end;
639
640
641
642    function [sfcm,sf,pds] = sforcoef(ns,nt,tm,p0,vv,dv,dvflag);
643    %
644    sfc = zeros(ns,nt);
645    ssf = zeros(nt,1);
646    if dvflag ~= 1
647        n2dv = abs(dv).^2;
648    else
649        n2dv = dv;
650    end;
651    dvvi = (2*vv).^(-1);
652    [aa,bb] = size(dvvi);
653    if aa == 1
654        dvvi = dvvi.';
655    end;
656    dvvim = dvvi*ones(1,nt);
657    [aa,bb] = size(n2dv);
658    if bb == 1
659        n2dv = n2dv.';
660    end;
661    [aa,bb] = size(p0);
662    if aa == 1
663        p0 = p0.';
664    end;
665    dm = ones(ns,1)*n2dv;
666    pdgsm = exp(-dm.*dvvim).*dvvim;
667    cfc = p0.*pdgsm(:,1);
668    csf = 1/(sum(cfc));
669    cfcp = csf*cfc;
670    sfc(:,1) = cfcp;
671    ssf(1) = csf;
672    for ii = 2:nt
673      nfc = ((cfcp'*tm).*((pdgsm(:,ii))'))';
674      nsf = 1/sum(nfc);
675      cfcp = nfc*nsf;
676      sfc(:,ii) = cfcp;
677      ssf(ii) = nsf;
678    end;
679    sfcm = sfc;
680    sf = ssf;
681    pds = pdgsm;
```

```
682
683
684     function [sbcm] = sbackoef(ns,nt,tm,p0,vv,dv,sc,pds,pdsflag,dvflag);
685     %
686     sbc = zeros(ns,nt);
687     [aa,bb] = size(p0);
688     if aa == 1
689        p0 = p0.';
690     end;
691     if pdsflag ~= 1
692        if dvflag ~= 1
693           n2dv = abs(dv).^2;
694        else
695           n2dv = dv;
696        end;
697        dvvi = (2*vv).^(-1);
698        [aa,bb] = size(dvvi);
699        if aa == 1
700           dvvi = dvvi.';
701        end;
702        dvvim = dvvi*ones(1,nt);
703        [aa,bb] = size(n2dv);
704        if bb == 1
705           n2dv = n2dv.';
706        end;
707        dm = ones(ns,1)*n2dv;
708        pdgsm = exp(-dm.*dvvim).*dvvim;
709     else
710        pdgsm = pds;
711     end;
712     csf = sc(nt);
713     csbc = csf*ones(ns,1);
714     sbc(:,nt) = csbc;
715     for ii = nt-1:-1:1
716        nsbc = sc(ii)*(tm*(csbc.*pdgsm(:,ii+1)));
717        sbc(:,ii) = nsbc;
718        csbc = nsbc;
719     end;
720     sbcm = sbc;
```

I claim:

1. A set of computer readable program instructions for implementing a method for detecting weak signals in a non-Gaussian and non-stationary background, comprising the steps of:
   a) partitioning input data into sets of range bins, where said input data has a noise component;
   b) estimating hidden Markov model parameters from said input data;
   c) determining an average intensity $I_i$ of said range bins, where i represents an index for said ranges bins, $1 \leq i \leq R0$, and R represents the total number of range bins;
   d) estimating an average noise intensity $N_i$ of each said range bin;
   e) determining a residual intensity estimates $\rho_i$ of each said range bin as the maximum of 0 and $(I_i-N_i)$ for all values of i;
   f) transforming said hidden Markov model parameters into estimates of hidden Markov model parameters of said noise component of said input data;
   g) generating modified locally optimal detection statistics representing the likelihood that said input data for said range bins contains a signal of interest using said estimates of said hidden Markov model parameters of said noise component of said input data, said residual intensity estimates, and said input data;
   h) transforming said modified locally optimal detection statistic into normalized values of said detection statistics applied to each said range bin; and
   i) generating a detection output signal if any of said normalized values of said detection statistics exceeds a threshold.

2. The method of claim 1 wherein step (a) further includes partitioning said input data into sets of contiguous range bins.

3. The method of claim 1 wherein said input data respresents signal returns.

4. The method of claim 3 wherein said signal returns include clutter.

5. The method of claim 3 wherein said signal returns are selected from the group consisting of radar signal returns, acoustic energy signal returns, and optical energy signal returns.

6. A program storage device readable by a machine, tangibly embodying a program of instructions executable by the machine to perform method steps, the method steps comprising:
   a) partitioning input data into sets of range bins, where said input data has a noise component;
   b) estimating hidden Markov model parameters from said input data;
   c) determining an average intensity $I_i$ of said range bins, where i represents an index for said ranges bins, and $1 \leq i \leq R$, and R represents the total number of range bins;
   d) estimating an average noise intensity $N_i$ of each said range bin;
   e) determining a residual intensity estimates $\rho_i$ of each said range bin as the maximum of 0 and $(I_i-N_i)$ for all values of i;
   f) transforming said hidden Markov model parameters into estimates of hidden Markov model parameters of said noise component of said input data;
   g) generating modified locally optimal detection statistics representing the likelihood that said input data for said range bins contain a signal of interest using said estimates of said hidden Markov model parameters of said noise component of said input data, said residual intensity estimates, and said input data;
   h) transforming said modified locally optimal detection statistic into normalized values of said detection statistics applied to each said range bin; and
   i) generating a detection output signal if any of said normalized values of said detection statistics exceeds a threshold.

7. The method of claim 6 wherein step (a) further includes partitioning said input data into sets of contiguous range bins.

8. The method of claim 6 wherein said input data respresents signal returns.

9. The method of claim 8 wherein said signal returns include clutter.

* * * * *